United States Patent [19]

Stottlemyer

[11] Patent Number: 5,689,086

[45] Date of Patent: Nov. 18, 1997

[54] SIMULATED SUSPENDED MINE RETRIEVAL SYSTEM

[75] Inventor: Thomas R. Stottlemyer, Mystic, Conn.

[73] Assignee: The United States of America as represented by the Secretary of the Navy, Washington, D.C.

[21] Appl. No.: 668,609

[22] Filed: May 20, 1996

[51] Int. Cl.⁶ .............. F42B 22/10; B63B 21/56; F16B 45/02
[52] U.S. Cl. .............. 102/411; 114/253; 24/599.1
[58] Field of Search .............. 89/1.11, 1.13; 102/411, 402, 403; 114/242, 244, 253; 24/599.1, 600.2, 115 F

[56] References Cited

U.S. PATENT DOCUMENTS

| | | | |
|---|---|---|---|
| 41,126 | 1/1864 | Sholl | 102/411 |
| 410,461 | 9/1889 | Splittstoser | 24/599.1 |
| 518,452 | 4/1894 | Holden | 24/599.1 |
| 842,970 | 2/1907 | Parsons | 24/599.1 |
| 1,723,416 | 8/1929 | Finne | 24/599.1 |
| 1,724,003 | 8/1929 | Chamberlain | 24/599.1 |
| 4,037,555 | 7/1977 | Berman | 114/253 |
| 4,570,245 | 2/1986 | Thigpen | 367/15 |
| 4,967,522 | 11/1990 | Groschupp et al. | 102/402 |
| 4,970,957 | 11/1990 | Backstein et al. | 102/403 |
| 5,343,742 | 9/1994 | Cusanelli et al. | 73/145 |
| 5,443,027 | 8/1995 | Owsley et al. | 114/244 |

*Primary Examiner*—Michael J. Carone
*Assistant Examiner*—Theresa M. Wesson
*Attorney, Agent, or Firm*—Michael J. McGowan; William F. Eipert; Prithvi C. Lall

[57] ABSTRACT

A simulated suspended mine retrieval system is described. It snares a simulated suspended mine at sea that is comprised of an anchor, a buoy and a tether connecting the anchor and buoy. The retrieval system has a cable connected to a loop for snaring the simulated suspended mine. In operation the retrieval system is towed from a vessel and the loop passes over the mine and strikes the tether. When this happens the loop has a shackling arrangement that snares the tether and is of such a size that it cannot slip over the mine. This enables the simulated suspended mine to be hoisted upon the towing vessel.

3 Claims, 3 Drawing Sheets

5,689,086

SIMULATED SUSPENDED MINE RETRIEVAL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention generally relates to a system used in a retrieval process. More particularly the system is used in retrieving a deployed simulated mine wherein the mine is comprised of a buoy attached to an anchor by a tether.

(2) Description of the Prior Art

The Navy has sponsored numerous simulated minefield installations and retrievals to support both submarine and surface ship mine avoidance training exercises. The mines used in these simulations following recovery are used in future operations. The mines are deployed by attaching a spherical buoy, called a target, to an anchor with a tether. The prior art retrieval process is accomplished by either sending divers down to attach a cable to the target, attaching a surface buoy and cable above the target, or placing an acoustic release at the lower end of the tether near the anchor. All of these procedures have serious problems associated with them. The diving method presents risks to human life, is extremely time consuming for a large minefield, and is limited to 130 ft. depths if the divers are using scuba equipment. The surface buoy procedure is not acceptable in many exercises because the ships using the minefield can become entangled. Acoustic releases, which acoustically disengage the anchor from the remainder of the system upon command, are expensive and put at risk of loss at sea when operated.

SUMMARY OF THE INVENTION

Accordingly, it is a general purpose and object of the present invention to provide an improved system for use in retrieving simulated mines deployed underwater. It is a further object that the system does not require personnel to be present in the water. A still further object is that the system obviates the use of surface buoys. Another object is the elimination of acoustic releases now sometimes in use. In addition, other objects are that the system be relatively inexpensive, efficient and easy to operate without requiring the use of highly trained personnel.

These objects are accomplished with the present invention by providing a system, towed from the rear of a vessel, that captures the simulated mine. The system has a first component that captures the simulated mine by encircling a tether line that is present in the simulated mine and a second component that signals to the vessel that the capture has been made. The vessel is then stopped and the simulated mine is hoisted aboard.

BRIEF DESCRIPTION OF THE DRAWINGS

For a more complete understanding of the present invention and the advantages thereof, reference is now made to the following description of the preferred embodiment taken in conjunction with the accompanying drawings in which.

DESCRIPTION OF THE PREFERRED EMBODIMENT

Figure 1:
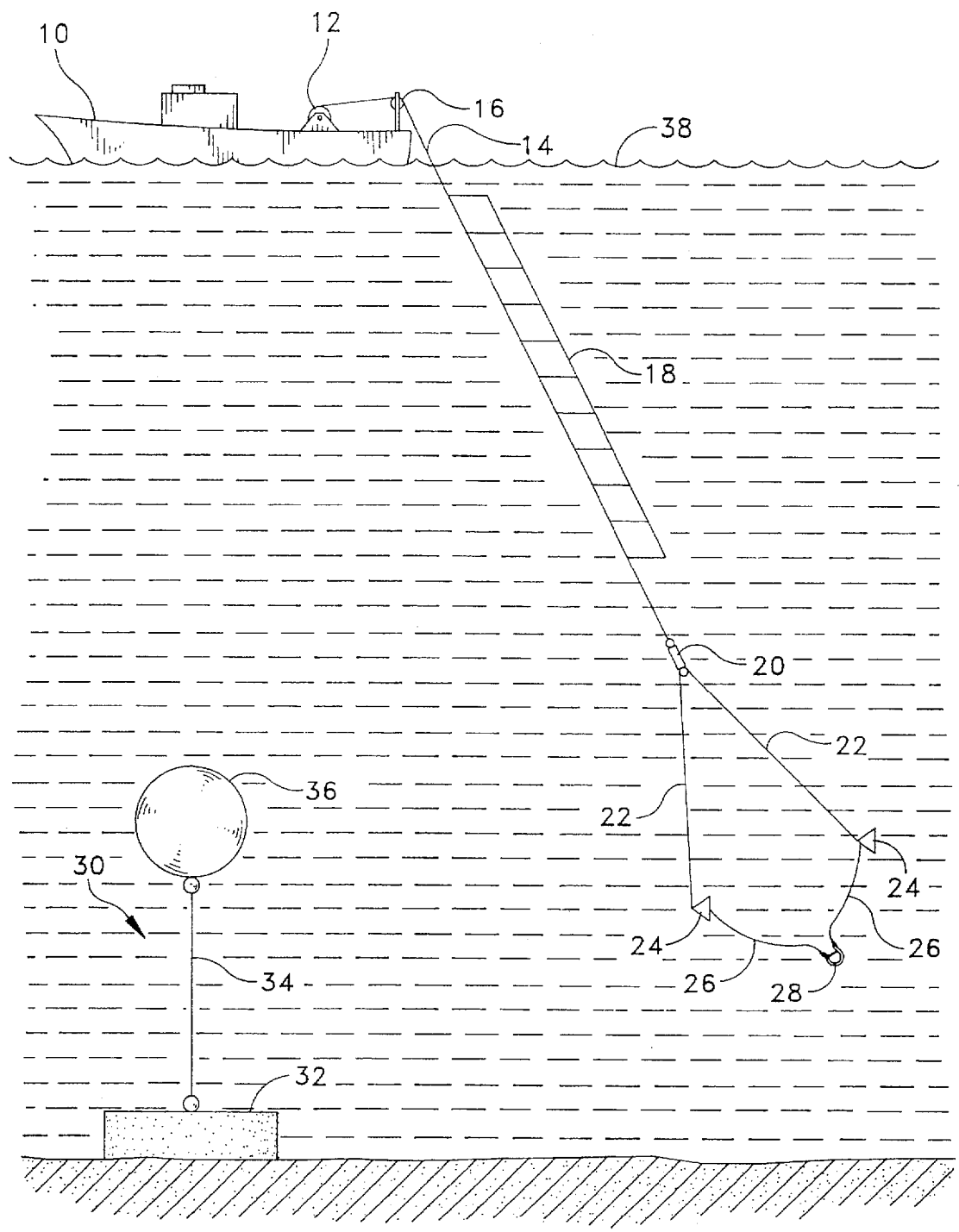
FIG. 1 shows an operational arrangement of a simulated suspended mine retrieval system in accordance with the present invention.

Refer now to FIG. 1 where there is shown a towing vessel 10 having a winch 12 to adjust the length of an electro-mechanical tow cable 14 that is drawn over a pulley 16. The electro-mechanical tow cable 14 has a fairing 18. A waterproof load cell 20 for measuring tension is attached to the electro-mechanical tow cable 14 at the end of the electro-mechanical tow cable that is away from the winch 12. The tensile loads at the end of the electro-mechanical tow cable 14 are sent electrically up the electro-mechanical tow cable 14 and displayed aboard the vessel 10. An additional two separate cables 22 are attached at one end to the load cell 20. The other end of each of the cables 22 are attached to two respective Lateral Force Devices (LFDs) 24. The two LFDs 24 are then connected to one another by two connecting cables 26 having a spring loaded locking shackle 28 connected to the connecting cables 26 at the ends of the connecting cables 26 away from the LFDs 24.

Additionally shown in FIG. 1 is a simulated suspended mine 30 comprised of an anchor 32, a tether line 34 and spherical buoy 36. The tether line 34 is of a length to keep the spherical buoy below the surface of the water 38 a distance to have the buoy, if it were armed, do optimum damage.

Figure 2:
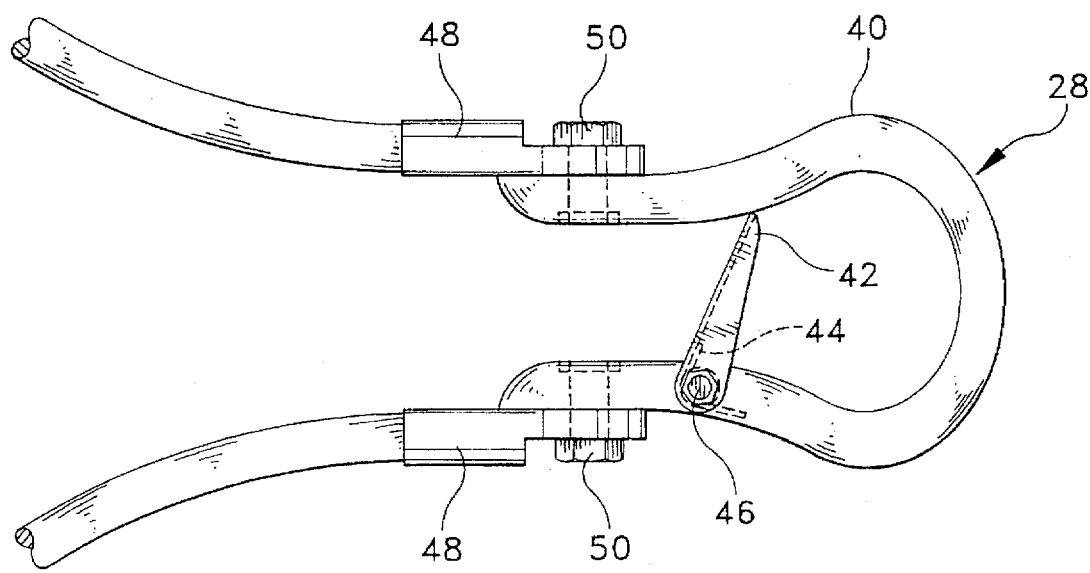
FIG. 2 is an enlarged view of a spring loading shackle which forms a component of the simulated suspended mine retrieval system of FIG. 1.

Refer now to FIG. 2 for a description of the spring loaded locking shackle 28. The spring loaded locking shackle 28 is comprised of a substantially U-shaped bar 40 having a locking arm 42 with a torsion spring 44 affixed to one leg of the U-shaped bar 40 by a nut and bolt arrangement 46 so that the locking arm 42 is held in abutment with the inner portion of the other leg of the U-shaped bar 40. The outer portions of the legs of the U-shaped bar 40 are connected to respective fittings 48 by a nut and bolt arrangement 50. The fittings 48 have respective connecting cables 26 affixed to them.

Figure 3C:
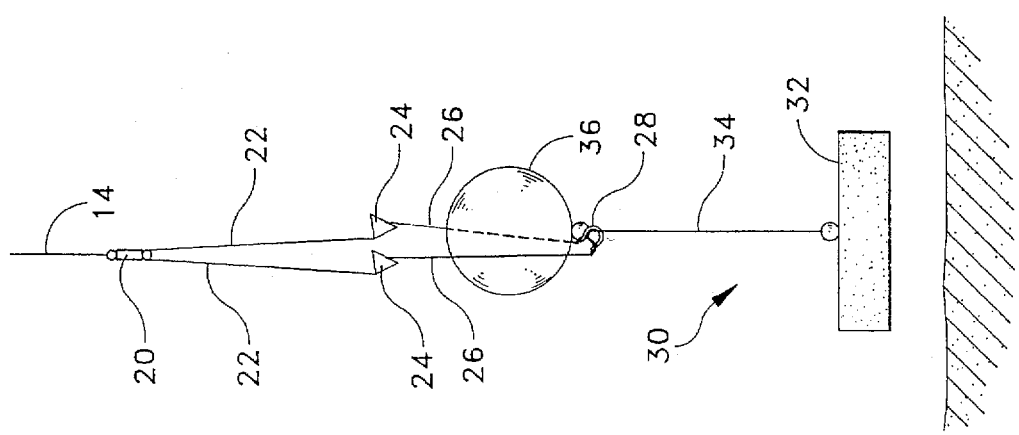
FIGS. 3A, 3B, and 3C show sequential operations of the simulated mine retrieval system of FIG. 1.
Figure 3B:
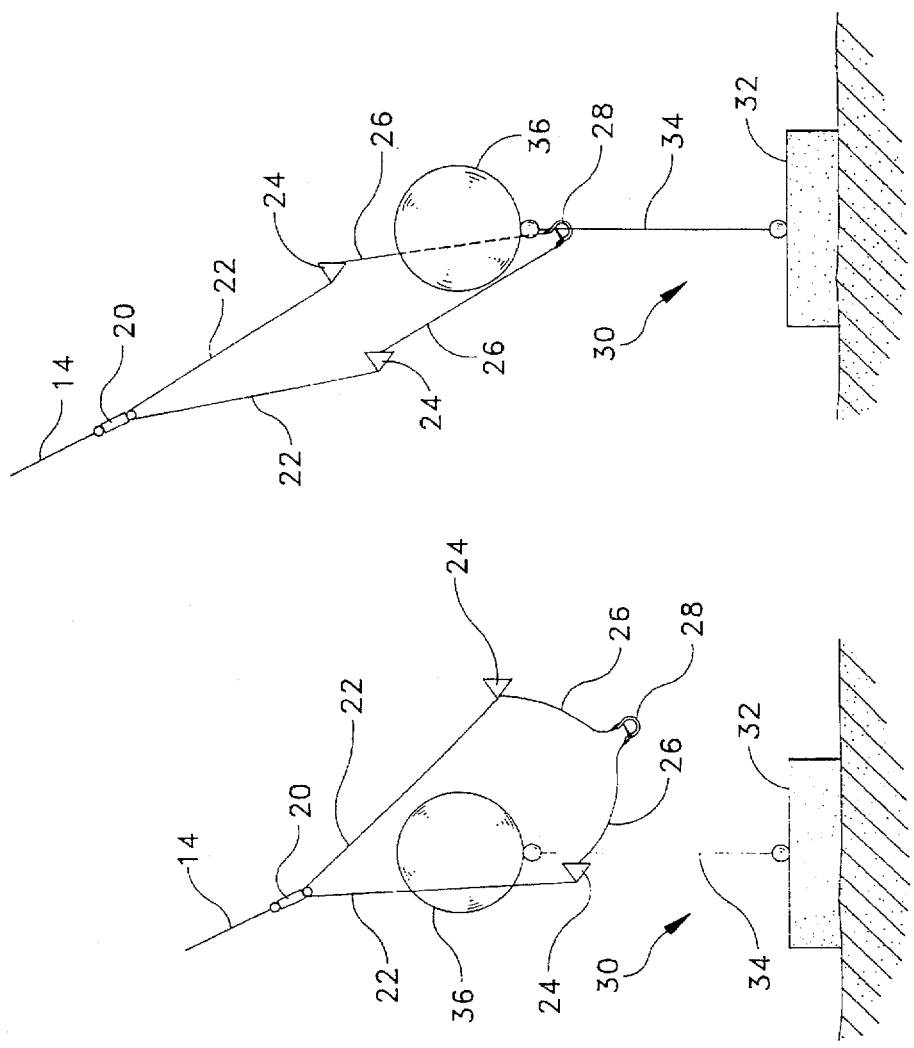
Figure 3A:
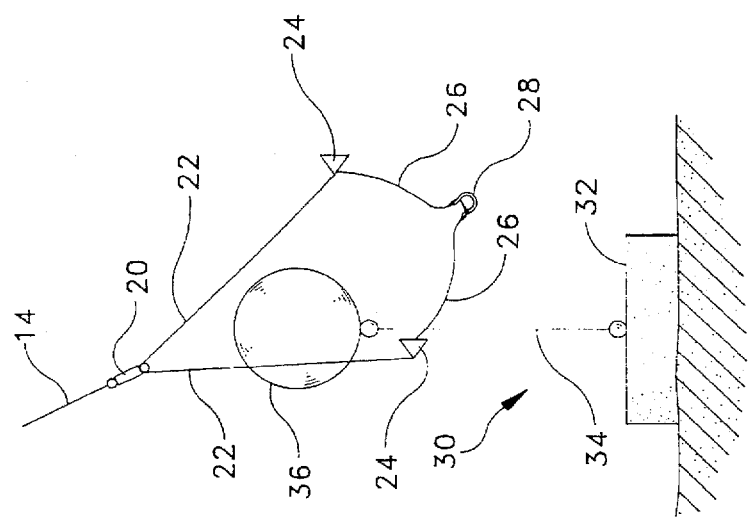

Referring now to FIGS. 3A, 3B, and 3C there is shown the retrieval operation of the inventive system.

In FIG. 3A there is shown that when the suspended simulated mine 30 is approached, the tether line 34 attaching the buoy 36 to the anchor 32 contacts either the spring loaded locking shackle 28 directly or one of the two connecting cables 26. When contacting one of the two connecting cables 26 the tether line 34 will slide toward the center to the spring loaded locking shackle. Anywhere the tether line makes contact between the two LFD's 24, the spring loaded locking shackle 28 will seize the tether line 34.

In FIG. 3B there is shown that upon capture of the simulated mine 30 in the locking shackle 28, the tension measured on the load cell 20 will increase drastically, and the ship is then directed to stop.

FIG. 3C then shows the simulated mine 30 being hoisted on board the ship for use in future exercises. This procedure is repeated for each of the simulated mines 30 in the field.

Computer programs have been written to determine the length of the tow cable 14 that should be deployed to achieve a certain depth in the water column, based on tow cable diameter, tow cable weight, ship speed, and drag forces caused by objects attached to the tow cable. A plot of depth vs. ship speed can be created to give the approximate depth of the locking shackle 28 as it is towed through the water. A simulated suspended minefield (not shown) can be retrieved by towing the locking shackle 28 and its associated system through the area where the field has been placed, with the locking shackle 28 10–20 feet deeper than the depth of the suspended spherical buoy 36. The tension measured on the load cell will be fairly constant during towing prior to capture and as mentioned previously will drastically increase upon capture of the simulated mine 30.

There has therefore been described a system for retrieving simulated suspended mines 30 without using divers, surface buoys, or acoustic releases. The amount of time consumed by operation of this system over that of preparing for diving, having divers search for the simulated mine, and attaching a cable to the simulated mine 30 is greatly reduced. The elimination of acoustic releases from the simulated mine reduces equipment costs and the elimination of surface buoys reduces the risk of a ship becoming entangled and thereby damaged. The equipment used in this invention is relatively inexpensive and both safe and easy to operate.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A simulated suspended mine retrieval system comprising:

a tow cable; and a loop attached to said tow cable, said loop includes a spring loaded locking shackle comprised of a substantially U-shaped bar having a locking arm with a torsion spring, one end of said locking arm being affixed to one leg of said U-shaped bar and the other end being held in abutment with the other leg of said U-shaped bar for inhibiting the other end of said locking arm from moving toward the end of said other leg of said U-shaped bar and for enabling said locking arm under a torque greater and opposite to that of the torsion spring to move away from the other leg of the U-shaped bar toward the center of the U-shaped bar.

2. A simulated mine retrieval system according to claim 1 wherein said loop further comprises a load cell attached to said tow cable.

3. A simulated mine retrieval system according to claim 2 wherein said loop further comprises:

a first and second cable connected at one end to said load cell;

a first and second lateral force device, with each of said first and second lateral force devices connected to respective other ends of said first and second cable; and a third and fourth cable, with each of said third and fourth cables connected at one end respectively to said first and second lateral force devices, and said third and fourth cables connected at their other ends respectively to said one leg and said other leg of said substantially U-shaped bar.

* * * * *